US007664826B2

(12) United States Patent
Kunisetty

(10) Patent No.: US 7,664,826 B2
(45) Date of Patent: Feb. 16, 2010

(54) SYSTEM AND METHOD FOR CACHING TYPE INFORMATION FOR UN-TYPED WEB SERVICE REQUESTS

(75) Inventor: Sunil Kunisetty, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 730 days.

(21) Appl. No.: 10/428,690

(22) Filed: May 1, 2003

(65) Prior Publication Data
US 2004/0221008 A1 Nov. 4, 2004

(51) Int. Cl.
G06F 15/16 (2006.01)
(52) U.S. Cl. .................. 709/217; 709/203; 709/219
(58) Field of Classification Search .......... 709/203, 709/217, 219
See application file for complete search history.

(56) References Cited

U.S. PATENT DOCUMENTS 6,185,613 B1 * 2/2001 Lawson et al. .......... 709/224
6,961,760 B2 * 11/2005 Li et al. .................. 709/219
6,986,121 B1 * 1/2006 Boshier et al. .......... 717/108
7,127,700 B2 * 10/2006 Large ...................... 717/100
7,376,959 B2 * 5/2008 Warshavsky et al. .... 719/330
2003/0065827 A1 * 4/2003 Skufca et al. ........... 709/315
2004/0006651 A1 * 1/2004 Dani et al. .............. 709/315
2004/0194057 A1 * 9/2004 Schulte et al. .......... 717/114
2007/0233871 A1 * 10/2007 Fletcher et al. ......... 709/226

* cited by examiner

Primary Examiner—Ario Etienne
Assistant Examiner—Avi Gold
(74) Attorney, Agent, or Firm—Park, Vaughan & Fleming, LLP

(57) ABSTRACT

A system and method for caching type information for parts (e.g., parameters) of an operation passed in a web service request. When an untyped request (i.e., a request in which the data types of operation parts are omitted) is received at a web service server from a client, a cache is examined to determine if type information for the requested operation's parts exists. If not, a cache entry specific to that operation is created and populate with the necessary type information (e.g., from a WSDL document corresponding to the web service). The type information for the operation, and any global type information (i.e., for data types global to the web service), is merged for use in unmarshalling the untyped request. The operation is invoked, and any results are returned to the client.

16 Claims, 2 Drawing Sheets

SYSTEM AND METHOD FOR CACHING TYPE INFORMATION FOR UN-TYPED WEB SERVICE REQUESTS

BACKGROUND

This invention relates generally to the field of computer systems. More particularly, a system and method are provided for caching type information for matching with un-typed service requests.

Web services are applications that that can be published and invoked in a manner independent of language and transport protocol. Thus, they include loosely coupled, distributed applications that can be accessed from multiple types of platforms (e.g., Unix-based, Windows-based) using different programming languages (e.g., Java, C++). Among other characteristics, they operate independently of the underlying transport protocol (e.g., HTTP, SMTP), and support synchronous and asynchronous communications.

Web services are often considered the $3^{rd}$ generation of distributed computing, because they provide greater interoperability and make greater use of standards than $2^{nd}$ generation technologies such as CORBA (Common Object Request Broker Architecture), COM (Component Object Model) and other more-tightly coupled, less-interoperable applications.

With web services, a service offered by a web service provider is called by a web service requester or consumer via a SOAP (Simple Object Access Protocol) request. The SOAP request may include any number of parameters for input to an operation that is provided by the service and identified in the request. The parameters may be typed or un-typed, meaning that the data types of the parameters are or are not identified in the request. If typed, the web service provider can easily unmarshal the parameters and invoke the requested operation.

However, if the parameters are un-typed, the web service provider must lookup the data types before invoking the operation. Typically, the service refers to the WSDL (Web Services Description Language) document that describes the web service and its operations. This increases the turnaround time of the request and requires the WSDL to be parsed, which slows execution of the requested operation.

SUMMARY

A system and method are provided for caching type information for parts (e.g., parameters) of an operation passed in a web service request. When an untyped request (i.e., a request in which the data types of operation parts are omitted) is received at a web service provider from a client, a cache is examined to determine if type information for the requested operation's parts exists. If not, a cache entry specific to that operation is created and populated with the necessary type information (e.g., from a WSDL document corresponding to the web service). The type information for the operation, and any relevant global type information (i.e., for data types global to the web service), is merged for use in unmarshalling the untyped request. The operation is invoked, and any results are returned to the client.

DETAILED DESCRIPTION

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the scope of the present invention. Thus, the present invention is not intended to be limited to the embodiments shown, but is to be accorded the widest scope consistent with the principles and features disclosed herein.

The program environment in which a present embodiment of the invention is executed illustratively incorporates a general-purpose computer or a special purpose device such as a hand-held computer. Details of such devices (e.g., processor, memory, data storage, display) may be omitted for the sake of clarity.

It should also be understood that the techniques of the present invention may be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof In particular, the methods described herein may be implemented by a series of computer-executable instructions residing on a suitable computer-readable medium. Suitable computer-readable media may include volatile (e.g., RAM) and/or non-volatile (e.g., ROM, disk) memory.

In one embodiment of the invention, a system and method are provided for caching type information for facilitating web service requests that contain one or more un-typed parameters (i.e., parameters not accompanied by information indicating the parameters' data types).

Web services allow computer systems within a connected (e.g., networked) environment to access functionality (e.g., applications, utilities, services) that may not be available locally on the systems. One goal of web services, which differentiates such applications from previous distributed computing technologies such as CORBA (Common Object Request Broker Architecture), EJB (Enterprise Java Bean), COM (Component Object Model), and so on, is their ability to accept requests generated in a variety of languages (e.g., Java, C++) on a variety of platforms (e.g., Unix, Microsoft Windows).

Generally, in distributed computing environments, a client makes a call to a remote server, the server processes the call and sends a response back to the client. Web services alter somewhat the manner in which the client-server model is employed.

Figure 1:
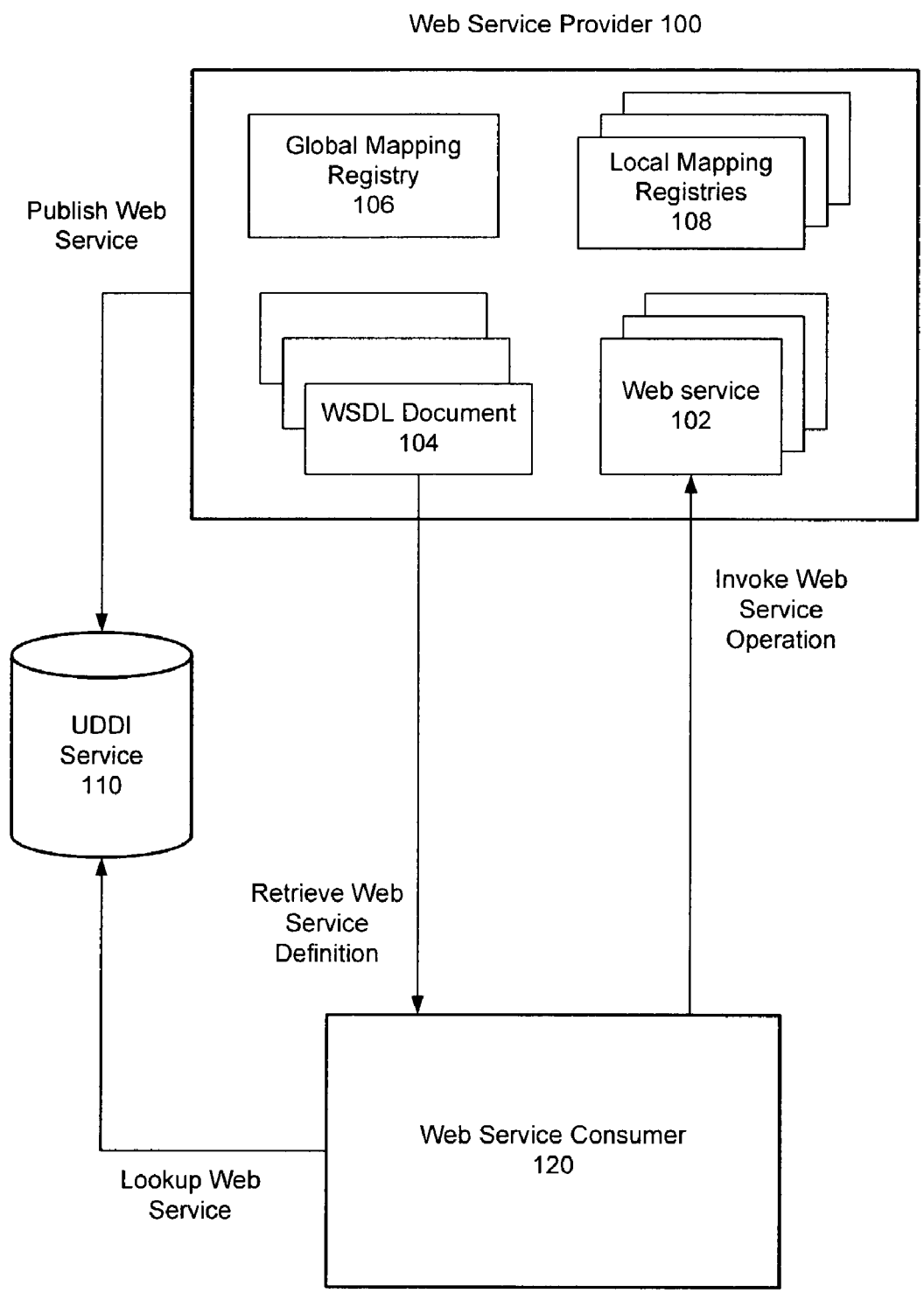
FIG. 1 depicts a distributed computing environment in which an embodiment of the present invention may be implemented.

FIG. 1 depicts a distributed computing environment in which an embodiment of the invention may be implemented. In this embodiment, a web service provider 100 produces/develops a web service and publishes or registers it as part of UDDI (Universal Description, Discovery and Integration) service 110. Illustratively, the publication may be done using JAXR (Java API for XML Registries) or comparable APIs (Application Programming Interfaces), via a request formatted according to SOAP (Simple Object Access Protocol).

Web service provider 100 may comprise virtually any platform and composition of computing equipment, and may be connected to other elements of the environment via the Internet or some other wide area or local area network. For each web service 102 offered by web service provider 100, the provider also generates a WSDL (Web Services Definition Language) document 104 describing the service and the format of operations offered by the service. Alternatively, a WSDL document may be provided by some entity other than web service provider 100. For example, an application developer may write their own WSDL document for a web service 102 and package the document with their implementation of the service.

Web service consumer 120 comprises a computer system or computing device operated by a business partner of provider 100, a user, or some other entity desiring access to a web service offered by the web service provider. The computer system or computing device is configured to access web service provider 100 via wired and/or wireless communications. The consumer may learn of a web service (e.g., web service 102) by performing a lookup on UDDI service 110, receiving a URL (Uniform Resource Locator) identifying provider 100, or in some other manner. Illustratively, a UDDI lookup for a specific web service or a type of web service may be performed by submitting an appropriate SOAP request to UDDI service 110.

Once the consumer identifies web service provider 100 as the provider of a desired service (e.g., by a URL returned by UDDI service 110), the consumer retrieves the corresponding WSDL definition (e.g., document 104) from the UDDI service, web service provider 100 or some other source. The WSDL document describes the operation semantics the consumer should use to invoke a desired web service operation.

Web service consumer 120 can then assemble a SOAP request containing the necessary information to invoke a desired operation. For example, consumer 120 may execute a tool or utility configured to generate suitable programming code from the WSDL. The generated code includes SOAP code for accessing the operation on web service provider 100. The request, including SOAP code generated from the WSDL, is passed to provider 100, which parses the request, invokes the operation and may return corresponding results to web service consumer 120.

In the computing environment of FIG. 1, various communication protocols and programming languages may be employed. For example, a network that interconnects provider 100, UDDI service 110 and consumer 120 may be TCP/IP based, or may use other protocols.

The following sample SOAP code comprises a typed request for a sayHello operation offered by a web service. The request is considered typed because the SOAP envelope identifies the data types of each part (e.g., parameter) of the operation.

EXAMPLE 1

```
<?xml version='1.0' encoding='UTF-8'?>
<SOAP-ENV:Envelope
xmlns:SOAP-ENV="http://schemas.xmlsoap.org/soap/envelope/"
xmlns:xsi="http://www.w3.org/2001/XMLSchema-instance"
xmlns:xsd="http://www.w3.org/2001/XMLSchema">
  <SOAP-ENV:Body>
    <ns1:sayHello xmlns:ns1="urn:Hello"
SOAP-ENV:encodingStyle="http://schemas.xmlsoap.org/soap/encoding/">
      <param0 xsi:type="xsd:string">Scott</param0>
      <param1 xsi:type="xsd:int">27</param1>
    </ns1:sayHello>
  </SOAP-ENV:Body>
</SOAP-ENV:Envelope>
```

Because type attributes indicating the data type of each part are included in the request, the receiver (e.g., web service provider 100 of FIG. 1) can easily construct the necessary objects and execute the sayHello operation.

In contrast, the following untyped request does not explicitly identify the data types of the operation parts.

EXAMPLE 2

```
<?xml version='1.0' encoding='UTF-8'?>
<SOAP-ENV Envelope
xmlns:SOAP-ENV="http://schemas.xmlsoap.org/soap/envelope/"
xmlns:xsi="http://www.w3.org/2001/XMLSchema-instance"
xmlns:xsd="http://www.w3.org/2001/XMLSchema">
  <SOAP-ENV:Body>
    <ns1:sayHello xmlns:ns1="urn:Hello"
SOAP-ENV:encodingStyle="http://schemas.xmlsoap.org/soap/encoding/">
      <param0>Scott</param0>
      <param1>27</param1>
    </ns1:sayHello>
  </SOAP-ENV:Body>
</SOAP-ENV:Envelope>
```

Because type information is not included in the SOAP code of Example 2, that information must be obtained elsewhere before the sayHello operation can be executed. For example, the type information may be retrieved from the WSDL that defines the web service offering the operation. A SOAP mapping registry may be created to associate the type information with the operation parameters. In traditional web services environments, this may need to be done every time the operation is invoked by a client.

Therefore, in one embodiment of the invention, a system and method are provided for creating a SOAP mapping registry once (e.g., the first time an operation is invoked) and then caching it for subsequent invocations of the same operation. Illustratively, multiple SOAP mapping registries may be cached, and may be differentiated by the name of the associated operation.

In this embodiment, two levels of caching are maintained. A global mapping registry is maintained to cache information for data types that may be used in multiple operations of the web service. The global mapping registry generally does not store information for data types that are local to a particular web service operation. The contents of the global mapping registry are available when any operation of the web service is invoked.

Also, local mapping registries are maintained for each operation, to store data type information specific to the operation's parts or parameters. Multiple local mapping registries may be stored in a cache table, and may be indexed by the operation name or other unique identifiers of the web service operations. Thus, each entry in the cache table constitutes a separate LMR. Illustratively, a local mapping registry is created upon the first invocation of the corresponding operation (e.g., not when the web service is initialized). Thus, the number of cache entries (LMRs) can be kept to a minimum.

Figure 2:
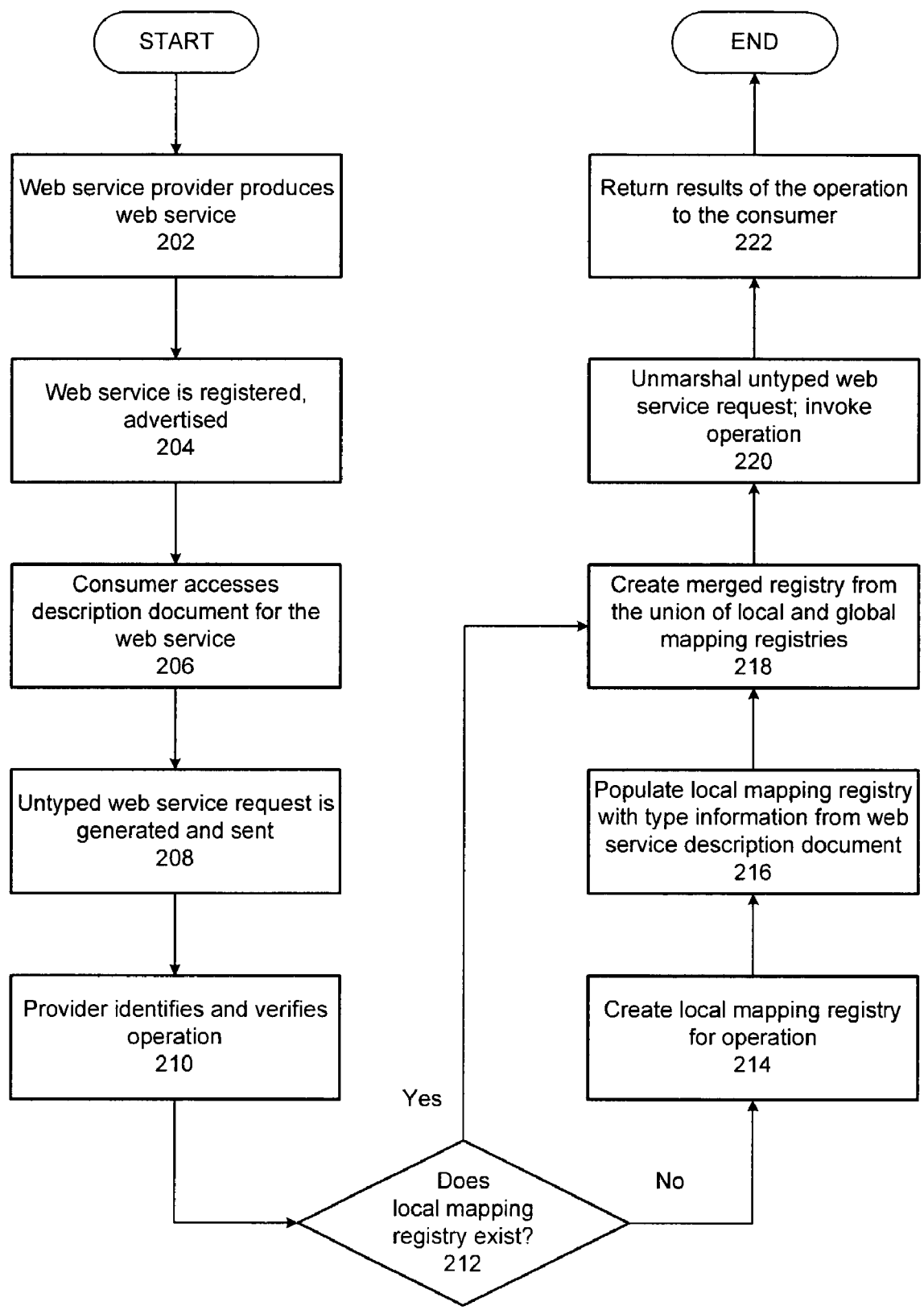
FIG. 2 depicts a method of caching data type information for satisfying a web service request, in accordance with an embodiment of the invention.

FIG. 2 demonstrates a method of caching type information for use with untyped SOAP web service requests, according to one embodiment of the invention. Although the method is described for client and server computer systems that use Java as a programming language, this embodiment of the invention may be implemented in distributed computing environments that employ various platforms, programming languages and communication protocols.

In state 202, a web service provider produces a web service. The web service may comprise any number of operations and may be deployed on any number of servers.

In state 204, the web service is registered with one or more UDDI services, and may be advertised or published in other ways to reach potential consumers of the web service. When the web service is registered with a UDDI service, a copy of the corresponding WSDL document (or other description) may be posted with the UDDI service.

In state 206, a consumer (e.g., a client computer system) learns of the service (e.g., through the UDDI service, in an electronic mail message, some other manner) and accesses the corresponding WSDL document (e.g., at the UDDI service, at the web service provider's site).

Using the WSDL, in state 208, the consumer generates code (e.g., Java programming code) for executing one or more methods offered by the web service. The generated code includes SOAP code for invoking an operation on a server operated by or for the web service provider. The SOAP code is used to marshal and send an untyped web service request to the provider.

In state 210, the SOAP request is received at the provider and the encapsulated operation is identified. The operation name may be verified by looking up the name in the WSDL document, a cache, or some other list of operations included in the web service.

In state 212, a cache table is examined to determine whether a global mapping registry and/or a local mapping registry for the operation exist. If the global registry does not exist, then there is no global type information that needs to be considered when unmarshalling the SOAP request. If the local mapping registry for the operation exists, the method advances to state 218. Otherwise, the method continues at state 214.

In state 214, a new local mapping registry is created and added to the cache table for the operation.

In state 216, the new local registry is populated with type information from the web service description (e.g. WSDL) document that pertains to the requested operation.

In state 218, a merged registry, for use in unmarshalling the SOAP request, is created by taking the union of the global mapping registry (if non-null) and the operation's local mapping registry. Thus, the unmarshalling code will have the type information it needs, without the danger of local data type information for one operation's parts or parameters contaminating another operation's local data type information.

In state 220, the SOAP request is unmarshalled and code (e.g., Java code) is created to allow invocation of the operation. For example, the type information may be used to generate necessary programming objects, and a Java (or other programming language) method corresponding to the operation can then be invoked.

In state 222, a return SOAP envelope containing the results of the operations is generated and sent to the consumer.

The foregoing descriptions of embodiments of the invention have been presented for purposes of illustration and description only. They are not intended to be exhaustive or to limit the invention to the forms disclosed. Accordingly, the above disclosure is not intended to limit the invention; the scope of the invention is defined by the appended claims.

What is claimed is:

1. A method of caching data type information for parts of a web service operation, comprising:

receiving at a web service provider a web service request, the web service request identifying a first web service operation and one or more parameters associated with the first operation, wherein data type information of the one or more parameters is omitted from the web service request;

identifying an operation name of the first operation identified by the web service request;

determining whether a first local mapping registry for the first operation exists in a cache on the web service provider;

responsive to the first local mapping registry not existing in the cache, creating the first local mapping registry for the first operation in the cache, wherein the first local mapping registry is populated with data type information from a web service description document, the data type information being associated with the one or more parameters of the first operation, and wherein the first local mapping registry is specific to the first operation;

creating a merged mapping registry from a global mapping registry for a plurality of operations and the cached first local mapping registry;

un-marshalling the web service request using the data type information in the merged mapping registry; and executing the first operation.

2. The method of claim 1, wherein the first local mapping registry is configured to store only data type information associated with the one or more parameters of the first operation.

3. The method of claim 2, further comprising:

creating the first local mapping registry only after the web service request is received.

4. The method of claim 1, further comprising:

for each of a plurality of web service operations other than the first operation, creating a second local mapping registry for storing data type information of the one or more parameters associated with each of the plurality of web service operations.

5. The method of claim 1, further comprising:

determining whether the global mapping registry configured to cache data type information for global data types is null.

6. The method of claim 5, further comprising:

if said global registry is not null, merging the contents of said global mapping registry and said first local mapping registry; and using said merged contents to generate one or more programming objects to facilitate said execution of said first operation.

7. The method of claim 1, further comprising:

verifying the operation name of the first operation against the web service description document.

8. The method of claim 1, further comprising:

receiving a second web service request for said first web service operation;

retrieving said data type information from said first local mapping registry; and using said retrieved data type information to facilitate execution of said first operation for said second web service request.

9. The method of claim 8, wherein said using said retrieved data type information comprises generating programming objects for the one or more parameters without retrieving data type information from the web service description document.

10. The method of claim 1, wherein the web service request is a Simple Object Access Protocol (SOAP) request.

11. A computer readable storage medium storing instructions that, when executed by a computer, cause the computer to perform a method of caching data type information for parts of a web service operation, the method comprising:

receiving at a web service provider a web service request, the web service request identifying a first web service operation and one or more parameters associated with the first operation, wherein data type information of the one or more parameters is omitted from the web service request;

identifying an operation name of the first operation identified by the web service request;

determining whether a first local mapping registry for the first operation exists in a cache on the web service provider;

responsive to the first local mapping registry not existing in the cache, creating the first local mapping registry for the first operation in the cache, wherein the first local mapping registry is populated with data type information from a web service description document, the data type information being associated with the one or more parameters of the first operation, and wherein the first local mapping registry is specific to the first operation, creating a merged mapping registry from a global mapping registry for a plurality of operations and the cached first local mapping registry;

un-marshalling the web service request using the data type information in the merged mapping registry; and executing the first operation.

12. A web server for storing data type information for untyped web service requests, comprising:

a receiver module configured to receive a web service request from a client identifying a first web service operation and one or more parameters associated with the first operation, wherein data type information of the one or more parameters is omitted from the web service request;

a request parser configured to parse said request to identify an operation name of the first operation identified by the web service request;

a cache located in the web server configured to store a first local mapping registry for the first web service operation, wherein the first local mapping registry is populated with data type information from a web service description document, the data type information being associated with the one or more parameters of the first operation, and wherein the first local mapping registry is specific to the first operation;

a determination logic configured to determine whether the first local mapping registry for the first operation exists in the cache in the web server;

a merged mapping registry configured to store contents from a global mapping registry for a plurality of operations and the cached first local mapping registry; and an un-marshaller configured to un-marshal said web service request using the data type information in the merged mapping registry.

13. The web server of claim 12, wherein the global mapping registry is further configured to store data type information for data structures used in multiple operations of the web service.

14. The web server of claim 12, wherein the un-marshaller is further configured to:

match the one or more parameters of said first operation with said corresponding data type information from said first local mapping registry; and generate programming objects for the one or more parameters without retrieving data type information from the web service description document.

15. The web server of claim 12, wherein said first local mapping registry is created only after said receiver module receives said web service request.

16. The web server of claim 12, wherein the web service request is a Simple Object Access Protocol (SOAP) request.

* * * * *

UNITED STATES PATENT AND TRADEMARK OFFICE
CERTIFICATE OF CORRECTION

PATENT NO. : 7,664,826 B2 Page 1 of 1
APPLICATION NO. : 10/428690
DATED : February 16, 2010
INVENTOR(S) : Sunil Kunisetty It is certified that error appears in the above-identified patent and that said Letters Patent is hereby corrected as shown below:

In column 2, line 27, after "thereof" insert -- . --.

In column 4, line 14, after "ENV" insert -- : --.

In column 7, line 23, in claim 11, delete "operation," and insert -- operation; --, therefor.

Signed and Sealed this

Thirtieth Day of November, 2010

David J. Kappos
*Director of the United States Patent and Trademark Office*